US012674700B2

(12) United States Patent
Mosteiro Vazquez et al.

(10) Patent No.: US 12,674,700 B2
(45) Date of Patent: Jul. 7, 2026

(54) METERING DEVICE FOR A MACHINE FOR MAKING A LIQUID PREPARATION

(71) Applicant: The Swatch Group Research and Development Ltd, Marin (CH)

(72) Inventors: Yoann Mosteiro Vazquez, Montmagny (CH); François Erdemli, Colombier (CH); Jean-Bosco Thanh Khai Dinh, Fribourg (CH); Michel Willemin, Preles (CH)

(73) Assignee: The Swatch Group Research and Development Ltd, Marin (CH)

( * ) Notice: Subject to any disclaimer, the term of this patent is extended or adjusted under 35 U.S.C. 154(b) by 207 days.

(21) Appl. No.: 18/711,124

(22) PCT Filed: Aug. 30, 2022

(86) PCT No.: PCT/EP2022/074027
§ 371 (c)(1),
(2) Date: May 17, 2024

(87) PCT Pub. No.: WO2023/110173
PCT Pub. Date: Jun. 22, 2023

(65) Prior Publication Data
US 2025/0012622 A1 Jan. 9, 2025

(30) Foreign Application Priority Data
Dec. 16, 2021 (EP) ..................................... 21215108

(51) Int. Cl.
*G01G 17/06* (2006.01)
*A47J 31/46* (2006.01)
(Continued)

(52) U.S. Cl.
CPC ............ *G01G 17/06* (2013.01); *A47J 31/468* (2018.08); *A47J 31/5255* (2018.08); *A47J 31/54* (2013.01); *A47J 31/58* (2013.01); *G05D 11/134* (2013.01)

(58) Field of Classification Search
CPC ..... G01G 17/06; A47J 31/468; A47J 31/5255; A47J 31/54; A47J 31/58; A47J 31/402;
(Continued)

(56) References Cited

U.S. PATENT DOCUMENTS 4,967,648 A * 11/1990 Helbling ............... A47J 31/525
99/302 R
5,207,148 A * 5/1993 Anderson ............. A47J 31/525
99/290
(Continued)

FOREIGN PATENT DOCUMENTS

WO WO 2015/138980 A1 9/2015
WO WO 2022/073612 A1 4/2022

OTHER PUBLICATIONS

International Search Report mailed Dec. 5, 2022 in PCT/EP2022/074027 filed on Aug. 30, 2022, 2 pages.

*Primary Examiner* — Vishal Pancholi
(74) *Attorney, Agent, or Firm* — Oblon, McClelland, Maier & Neustadt, L.L.P.

(57) ABSTRACT

A metering device for a machine for making a liquid preparation includes a liquid reservoir for storing a fluid and for feeding, via an inlet line, at least one pump arranged to force the fluid to pass, in the liquid and/or vapour state, through at least one doser including at least one ingredient, in order to make the preparation, and to dispense the preparation to an outlet line. The metering device also includes means for continuously measuring the mass of the reservoir and of its contents, and control means interfaced with the continuous measurement means and arranged to
(Continued)

monitor the total mass as a function of time, and to instantaneously calculate the mass of the preparation already dispensed, to adapt the duration of operation of the pump to ensure that the exact quantity of preparation required is dispensed, and/or to trigger the shutdown of the pump if it is found to be running dry.

24 Claims, 2 Drawing Sheets

(51) Int. Cl.
  *A47J 31/52*          (2006.01)
  *A47J 31/54*          (2006.01)
  *A47J 31/58*          (2006.01)
  *G05D 11/13*          (2006.01)

(58) Field of Classification Search
  CPC ....... A47J 31/525; A47J 31/36; G05D 11/134;
                          G01F 23/20; G01F 25/20
  See application file for complete search history.

(56)                    References Cited

U.S. PATENT DOCUMENTS

| | | | | |
|---|---|---|---|---|
| 6,007,236 | A * | 12/1999 | Maguire ............... | B01F 35/881 |
| | | | | 366/76.1 |
| 9,539,582 | B2 * | 1/2017 | Gallestey Alvarez . | G05B 13/04 |
| 2015/0239724 | A1 * | 8/2015 | Cronise ................... | G07F 9/023 |
| | | | | 222/23 |
| 2015/0305551 | A1 * | 10/2015 | Rosati ..................... | A47J 31/56 |
| | | | | 99/280 |

* cited by examiner

METERING DEVICE FOR A MACHINE FOR MAKING A LIQUID PREPARATION

FIELD OF THE INVENTION

The invention relates to a metering device for a machine for making a liquid preparation, including a liquid reservoir for storing a fluid and for feeding, via an inlet line, at least one pump arranged to force said fluid, in the liquid and/or vapour state, to pass through at least one doser arranged to contain at least one ingredient, for making said preparation, and to dispense said preparation to at least one outlet line.

The invention further relates to a machine for making a liquid preparation, including at least one such metering device.

The invention further relates to a method for the instant production of a liquid preparation based on at least one powdered or concentrated or freeze-dried ingredient, and at least one fluid, in such a machine for making a liquid preparation.

The invention relates to the field of household goods for making liquid preparations, individually or in small quantities, for private individuals or small groups such as coffee shops, restaurants and caterers, or even offices, for example for the production of soups, coffee or other preparations obtained by passing a fluid over an ingredient stored in a reduced form, such as a sachet of freeze-dried product, a dose of coffee or tea in powder form, a dose of tomato concentrate, or the like.

The principle of the invention is also applicable to other production means including a metering function, for example for the preparation of pharmaceutical compositions in pharmacies, or the like.

BACKGROUND OF THE INVENTION

The production of liquid preparations such as cups of coffee, tea, soup or the like, in a substantially unitary manner, has been facilitated by the packaging of ingredients in small volumes, in sachets, capsules or pods, designed to dispense a standard quantity corresponding to a cup of varying volume, in parallel with the marketing of small, simple, compact machines designed to make these preparations, with user intervention reduced to simple tasks: introduction of a liquid, typically water, into a reservoir, introduction of a packaged ingredient into a chamber or slot, selection of a preparation option, regarding quantity or density, and start of a cycle.

The liquid is conveyed by a pump, either directly or via a boiler, through the prepared ingredient. Typically, the selection made by the user corresponds to a pre-determined cycle time, which is managed by a timer controlling the running time of the pump and any boiler. However, it is not uncommon for the volume dispensed to vary greatly for the same initial setting, for a variety of reasons: hardness of the water, scale build-up in the appliance and especially the pump, wear and tear of the pump, inaccurate positioning of the packaged ingredient in its chamber or slot, incorrect insertion of the dose or capsule into the machine, or other reasons.

As a result, open-loop operation, such as activating the pump for a memorised period of time using a timer or the like, does not guarantee that the required quantity of preparation is dispensed downstream of the machine.

SUMMARY OF THE INVENTION

The aim of the invention is to provide a simple and inexpensive solution to these quality problems, which solution is compatible with mass-market machines.

To achieve this, the invention proposes ensuring that a constant volume of preparation is dispensed to the user, by means of differential measurements.

By inserting a mass sensor under the liquid reservoir, and monitoring the mass dispensed, a simple correlation can be made, taking into account vaporisation losses, to dispense just the right amount of liquid to ensure that the required quantity of liquid preparation is accurately achieved, and, of course, to keep the pump and boiler running for just the right amount of time.

To this end, the invention relates to a metering device for a machine for making a liquid preparation, according to claim 1.

The invention further relates to a machine for making a liquid preparation, which machine includes at least one such metering device.

The invention further relates to a method for the instant production of a liquid preparation based on at least one powdered or concentrated or freeze-dried ingredient, and at least one fluid, in such a machine for making a liquid preparation.

BRIEF DESCRIPTION OF THE DRAWINGS

Other features and advantages of the invention will become apparent from the following detailed description and with reference to the accompanying drawings, where.

DETAILED DESCRIPTION OF PREFERRED EMBODIMENTS

The aim of the invention is to ensure that the volume of preparation dispensed to the user remains constant.

The principle is to make use of the continuous measurement of the mass of the liquid reservoir upstream of the preparation machine.

Figure 4:
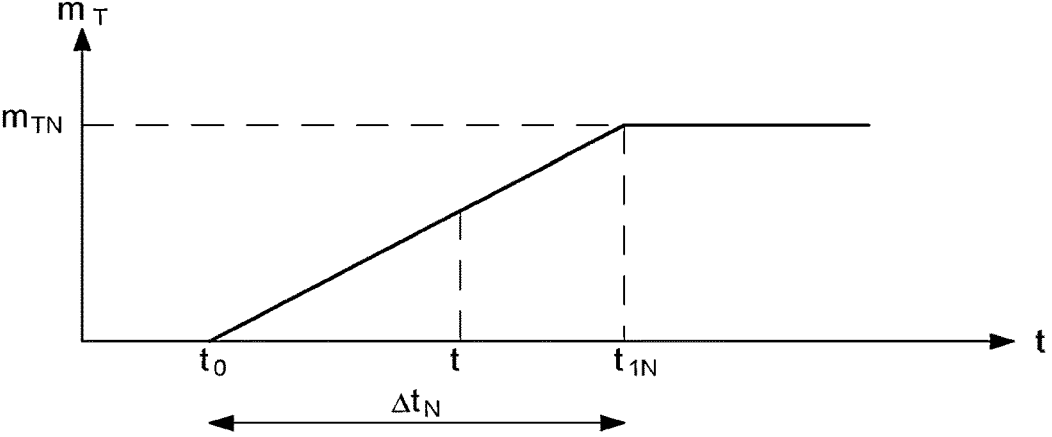
FIG. 4 diagrammatically shows a calibration curve for determining the volume of liquid corresponding to a mass of product dispensed as desired by the user, in the particular case of a constant pump flow rate, with the time on the x-axis and the mass of product dispensed on the y-axis.

To do this, the curve $m_{TN}(t)$ visible in FIG. 4, and the time $\Delta t_N$ corresponding to calibration, for the production of a particular liquid preparation, are stored in memory. This curve is the theoretical curve resulting from training, particularly in manual mode.

Figure 5:
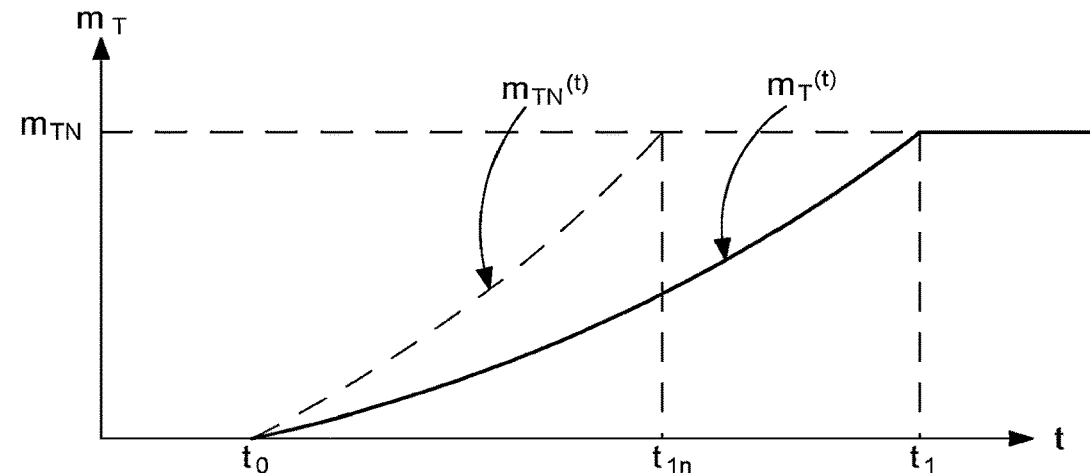
FIG. 5 shows, similarly to FIG. 4, a real operating curve, i.e. that takes into account the state of the machine at the time in question.

The subsequent production of such a particular liquid preparation follows a curve according to FIG. 5, with a cycle time that is greater than or equal to the reference cycle time $\Delta t_N$ in FIG. 4.

The area under the curve $m_T(t)$ is then compared with that of $m_{TN}(t)$. A variation greater than a pre-determined threshold, equal to 15% in a non-limiting example, is indicative of a problem. Using the area to monitor production is preferable to monitoring a deviation between the two curves or between their slopes, because the area is less sensitive to local noise/peaks and control is thus more robust and reliable.

Figure 1:
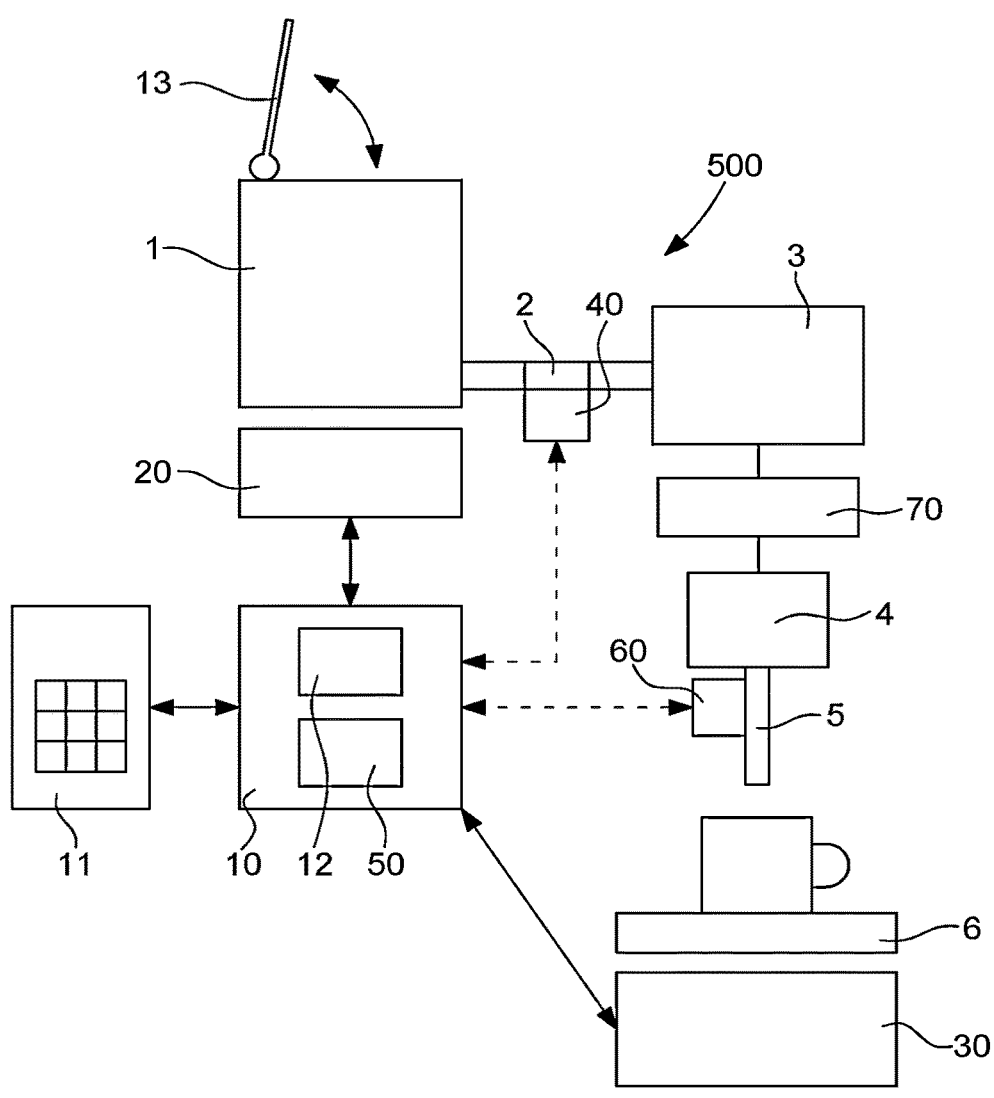
FIG. 1 diagrammatically shows a metering device according to the invention.
Figure 2:
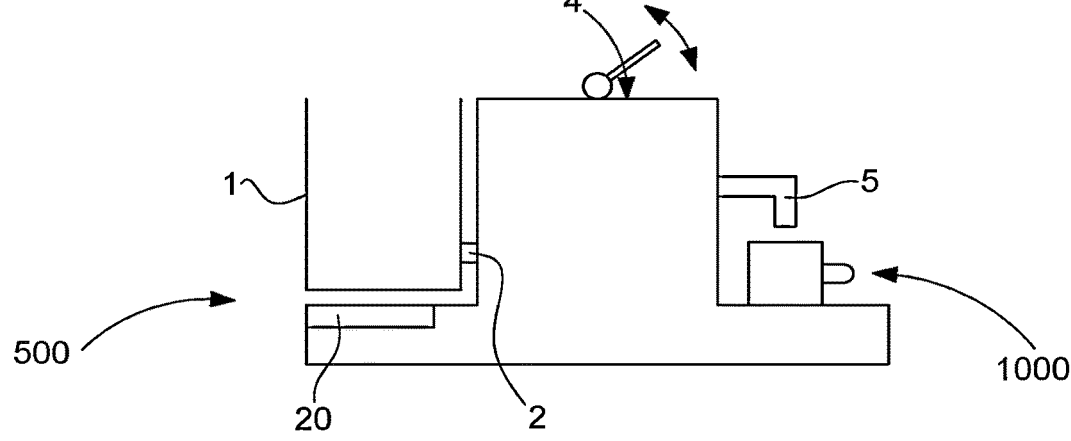
FIG. 2 diagrammatically shows a machine for making a liquid preparation, which machine includes such a metering device according to the invention.
Figure 3:
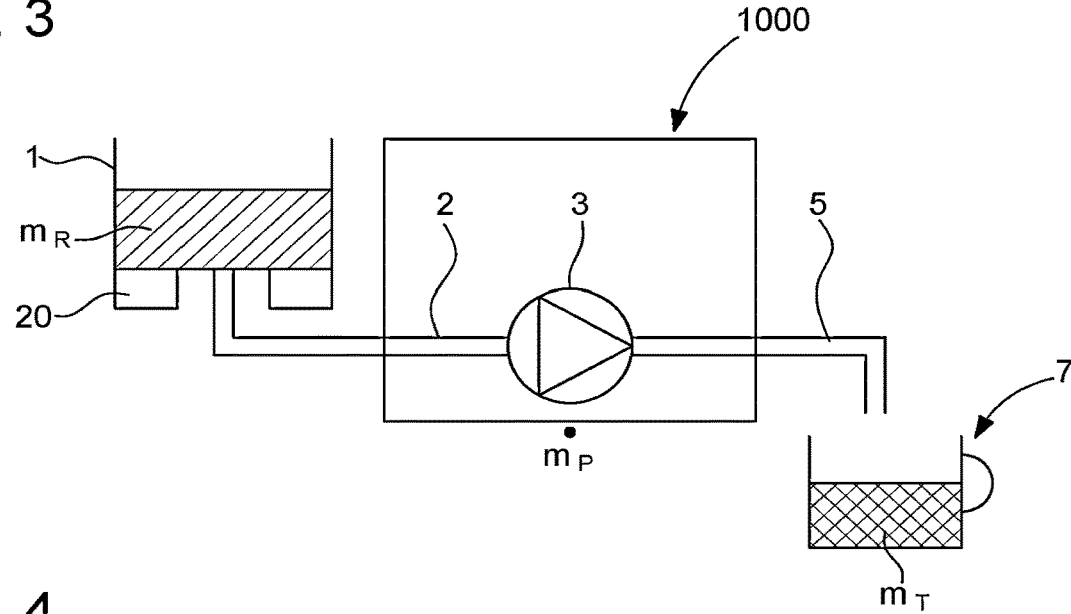
FIG. 3 diagrammatically shows the route taken by the fluid used to produce this liquid preparation, through this machine, from a liquid reservoir upstream of the machine, of which only a pump is shown, to a downstream outlet line feeding a container with a certain quantity of dispensed preparation.

FIG. 3 is a simplified diagram of a machine for making a liquid preparation, with a liquid reservoir upstream of the machine, of which only a pump is shown, and a downstream outlet line feeding a container.

The mass, at time t, of liquid present in this container, which is equivalent to the mass of liquid pumped from the reservoir into the container, is denoted $m_T(t)$, and the mass, at time t, of the liquid reservoir, i.e. the total of the mass of the reservoir structure and of the mass of the quantity of liquid present in the reservoir at time t, is denoted $m_R(t)$. The notation $m_p(\dot{m}_p$ with a dot above) corresponds to the mass flow rate of the pump.

Setting up the machine includes a calibration phase: this is the calibration of the volume desired by the user. This volume corresponds to a mass of liquid $m_{TN}$, pumped from the machine's liquid reservoir, and to a filling time $\Delta t_N$ (N for nominal) that is dependent on the pump flow rate.

This calibration cycle is carried out by the user, for example by pressing and holding a start button or pushbutton, or the like. During this calibration or programming phase, an action by the user is required to determine when the machine must stop, which corresponds to when the required quantity of preparation desired by the user has been dispensed, and the liquid level required for this purpose is stored in memory. This cycle starts at time $t_o$ and ends at tin ($\Delta t_N$ denotes the difference).

FIG. 4 diagrammatically shows the calibration curve $m_T(t)$, in a particular, non-limiting case of a constant pump flow rate.

Operational use of the machine is based on this initial calibration, for a particular liquid preparation, which is particular at least in quantity, and which can also be particular in terms of density, of the liquid and/or ingredients used, of the output temperature, or the like.

The operating cycle starts at time $t_o$ and ends at $t_1$.

At time $t_0$, the mass in the reservoir is $m_R(t_0)=m_{RO}$.

We calculate the instantaneous mass at time t: $m_T(t) =m_{RO}-m_R(t)$.

This calculation is based on the continuous measurement of the mass $m_R(t)$ (the only variable measured).

The presence of a disturbance, such as an unexpected filling of the reservoir (resulting in a negative value of $m_T(t)$), or a technical fault such as the presence of scale in the circuits, or a pump or boiler malfunction, causes the actual curve $m_T(t)$ to evolve differently from the calibration curve $m_{TN}$ (t), as shown in FIG. 5.

As a result, if the pump is stopped at tin, the volume dispensed to the container will not be accurate.

The invention proposes comparing the current curve $m_T(t)$ with the reference calibration curve $m_{TN}(t)$ which will have been saved in memory.

The comparison is based on a calculation of the area under the curve S(t):

$$S(t) = \int_{t_0}^{t} m_T(u)du \text{ and}$$

$$S_N(t) = \int_{t_0}^{t} m_{TN}(u)du$$

The advantage of comparing areas, rather than the curves themselves, is the smoothing effect of the integral, which is less sensitive to isolated defects.

If there is too great a difference between S(t) and $S_N(t)$, an alarm can be triggered to warn the user and/or an automated driving system:

if, in addition, $m_R(t)$ increases (in the case of unexpected filling), the pump is stopped and restarted when $m_R(t)$ has stopped changing;

if $m_R(t)$ decreases, this indicates an anomaly, such as a flow rate that is too low, which should trigger the proposal of a maintenance action to be carried out.

The closed-loop operation of the machine, with continuous measurement of the mass of the upstream liquid reservoir, means that it is possible to integrate the actual instantaneous state of the machine, or the quality of the liquid such as the hardness of the water, or any other physical parameter that can influence the liquid preparation production process. The pump must operate as long as the total mass of preparation dispensed downstream is less than the desired set quantity.

Regulation by control means, preferably integrated into the machine, makes it possible to automatically extend the operating time to compensate for a drop in flow rate for any reason, and to obtain the desired setpoint quantity precisely and without excess.

More particularly, the invention relates to a metering device 500 for a machine 1000 for making a liquid preparation. This metering device 500 includes a liquid reservoir 1 for storing a fluid and for feeding, via an inlet line 2, at least one pump 3. This pump 3 is arranged to force the fluid, in the liquid and/or vapour state, to pass through at least one doser 4 arranged to contain at least one ingredient, for making the preparation, and to dispense the preparation to at least one outlet line 5.

According to the invention, the metering device 500 includes means for continuously measuring the mass of the contents of the reservoir 1, or the mass of the reservoir 1 and its contents. More specifically, the reservoir can be tared beforehand. It goes without saying that any of the measurements described below can be taken in relative or absolute terms. The metering device 500 includes control means 10, which are interfaced with these continuous measurement means, and which are arranged to monitor the total mass as a function of time. These control means 10 are further designed to instantaneously calculate the mass of liquid preparation already dispensed, to adapt the operating time of the pump 3 to ensure that the exact quantity of preparation required is dispensed, and/or to switch off the pump 3 if it is found to be running dry, in order to avoid cavitation phenomenon and damage to the pump.

Any anomaly linked to a too low liquid level in the reservoir is thus avoided, and the pump is protected in all circumstances. There is therefore no need to fit the machine with an optical sensor to detect low levels in the reservoir.

Mass measurement is advantageous for detecting when the pump is running dry and for stopping the cycle in time. There is therefore no need to fit the machine with a flowmeter or the like in order to protect the pump from dry running.

More particularly, the means for continuously measuring the mass of the reservoir 1 and its contents, or solely of the contents of the reservoir 1, include means 20 for weighing the reservoir 1 and its contents, which means are interfaced with control means 10 included in the metering device 500, and which means are arranged to determine the initial mass of the reservoir 1 and its contents, or solely of the contents of the reservoir 1, as soon as a preparation production cycle is started. These control means 10 are further arranged to calculate a mass of liquid to be dispensed upstream of the pump 3, depending on the nature of the liquid preparation, the density or aromatic density of the liquid preparation, the at least one ingredient, the fluid, and the quantity required when the production cycle is started. For example, for the same coffee pod, a setting allows the user to select a particular type of beverage: espresso, lungo, ristretto, or the like. These control means 10 are further arranged to activate the pump 3 when the cycle is started, to continuously control the weighing of the instantaneous mass of the reservoir 1 and its contents, or solely of the contents of the reservoir 1, and to dispense the required quantity of liquid preparation to the outlet line 5.

The weighing means 20 can incorporate different types of sensor: strain gauge, piezoelectric sensor, pressure-sensitive film, or any other sensor capable of measuring mass, pressure or force. Such a sensor can be placed between the body of the machine and the reservoir 1, to allow real-time calculation of the volume of liquid present in the reservoir, the tare of which is known or easy to store in memory.

More particularly, the control means 10 are arranged to be activated to start the production cycle, either by a user action on a control panel 11 interfaced with the control means 10, or by a command from an automated system interfaced with the control means 10.

More particularly, the control means 10 are designed to detect unexpected filling of the reservoir 1 when the pump 3 is in operation. More particularly, the control means 10 are designed to stop the pump 3 if an increase in the instantaneous mass of the reservoir 1 and its contents, or solely of the contents of the reservoir 1, is detected. More particularly still, the control means 10 are arranged so that, if an increase in the instantaneous mass of the reservoir 1 and its contents, or solely of the contents of the reservoir 1, is detected, they wait for the mass to stabilise and restart the feeding cycle of the pump 3 until the required quantity of the preparation has been completely dispensed to at least one outlet line 5, and stop the operation of the pump 3 when the comparison indicates that the mass of liquid to be dispensed has been dispensed in its entirety to the pump 3.

More particularly, the control means 10 are arranged to measure the value of the initial mass of the reservoir 1 and its contents, or solely of the contents of the reservoir 1, on starting a production cycle, and, if the instantaneous mass of the reservoir 1 and its contents, or solely of the contents of the reservoir 1, is found to be constant or decreasing, to continuously compare the value of the mass of liquid to be dispensed with the value of the difference between the initial mass and the instantaneous mass, and to stop operation of the pump 3 when the comparison indicates that the mass of liquid to be dispensed has been dispensed in its entirety to the pump 3.

More particularly, the control means 10 are designed, in the event of an increase in the instantaneous mass of the reservoir 1 and its contents, or solely of the contents of the reservoir 1, to record in memory means 12, included in the control means 10, a first intermediate value which is the value of the instantaneous mass of the reservoir 1 and its contents, or solely of the contents of the reservoir 1, at the moment when the instantaneous mass increases. Moreover, these control means 10 are arranged to follow the weighing means 20 until it is established that the instantaneous mass has stabilised at a second intermediate mass, to calculate the deviation between the second intermediate mass and the first intermediate mass, and to calculate a new upstream mass which is the total of the initial mass and the deviation, and to restart operation of the pump 3 and continuously carry out the comparison between the value of the mass of liquid to be dispensed and the value of the difference between the upstream mass and the instantaneous mass, and to stop operation of the pump 3 when the comparison indicates that the mass of liquid to be dispensed has been dispensed in its entirety to the pump 3.

Advantageously, in a particular embodiment, the control means 10 are arranged to compare the theoretical calibration curve for monitoring the mass of the reservoir as a function of time, with the actual curve during the execution of a cycle. In this alternative embodiment, a deviation threshold between these two curves can be programmed in order to trigger an alert. Depending on the programming, this alert can be used, in a non-limiting example:

to stop the cycle, by deactivating the pump, and generate an error message;

to stop the cycle, then keep the pump inactive as long as the mass of the reservoir is changing, then resume the cycle when the mass of the reservoir stops changing More specifically, the metering device 500 includes shut-off means 13 designed to prevent the reservoir 1 from being filled when the production cycle is started and until the mass of liquid to be dispensed has been dispensed in its entirety to the pump 3.

More particularly, the control means 10 include means 12 for storing in memory, for each type of liquid preparation based on a fluid-ingredient pair, the correlation between the quantity of fluid to be supplied and the quantity of liquid preparation dispensed.

More particularly, the metering device 500 includes, downstream of the outlet line 5, at least one receptacle 6, which is arranged to receive at least one container intended to receive the liquid preparation, and includes, in one alternative embodiment, secondary weighing means 30, which are interfaced with the control means 10, and are arranged to measure the tare constituted by the at least one container, and to continuously monitor the quantity of liquid preparation dispensed. The mass of the container and the quantity of dispensed preparation contained therein can thus be continuously and repeatedly measured until the desired quantity is reached. It goes without saying that the control means 10 are arranged to stop the pump 3 in time, when the secondary weighing means 30 detect downstream that the quantity of dispensed preparation is nearing the desired quantity to avoid any overflow.

More particularly, the metering device 500 includes, at the inlet line 2, at least one inlet flowmeter 40, interfaced with the control means 10 and a clock 50 included in the control means 10, for continuous monitoring of the quantity of fluid dispensed to the pump 3.

More particularly, the metering device 500 includes, in the region of the outlet line 5, at least one outlet flowmeter 60, interfaced with the control means 10 and a clock 50 included in the control means 10, for continuous monitoring of the quantity of the liquid preparation dispensed by the outlet line 5.

More particularly, the metering device 500 includes, between the pump 3 and the at least one doser 4, at least one boiler 70 for heating and/or vaporising the fluid before it passes into the at least one doser 4.

In a particular alternative embodiment, the control means 10 include a function for monitoring, over time, a machine 1000 incorporating such a metering device 500. The control then makes it possible to monitor the ratio between, on the one hand, an initial duration measured during training or initial use and corresponding to the supply of the mass of liquid to be dispensed to provide the ideal volume, and on the other hand, the actual duration required to supply the same mass after multiple months/years of introduction functions, for a particular preparation, and allows this ratio to be compared in real time with a pre-determined threshold value for this ratio, a threshold which once exceeded gives rise to the display of a maintenance message for the machine 1000 or for the metering device 500, to trigger descaling or another maintenance operation. It is understood that the purpose of this control of the duration of the production cycle of a liquid preparation is not to manage the operation of the machine 1000 or of the metering device 500 for making a liquid preparation, but to allow the maintenance of the equipment to be monitored during its lifetime.

Thus, if this machine 1000 works perfectly at the time of purchase, with an initial required volume of water of 100% for a given cycle time, after several months of use and depending on the hardness of the water, the same 100% volume is likely to require much more time to be dispensed. The invention makes it possible to do away with the need to manage the unit cycle time for the production of a liquid preparation, and this provision for integrating a threshold into the control process makes it possible to avoid the case where the volume passing through the pump 3, the doser 4 and an optional boiler 70 becomes so low that the pump 3 operates for much longer than is reasonable, making it more fragile and risking it breaking if a maintenance operation is not initiated in time.

More particularly, the control means 10 include a control panel 11, or are interfaced with a control panel 11, and include a learning cycle arranged to allow a user to prepare a particular liquid preparation manually, and to select the quantity of the liquid preparation, and/or the nature of the liquid preparation, and/or the density or the aromatic density of the liquid preparation, and/or the nature of the at least one ingredient, and/or the nature of the fluid, and to trigger automatic storage, in memory, of the operating parameters of the metering device 500 for this particular liquid preparation, and the correlation between the quantity of the liquid preparation at the outlet line 5 and the mass of liquid to be dispensed upstream of the pump 3.

More particularly, the control means 10 include a control panel 11, or are interfaced with a control panel 11, and include a learning cycle arranged to allow an automated system interfaced with the control means 10 to control the dispensing of a particular liquid preparation, and to select the quantity of the liquid preparation, and/or the nature of the liquid preparation, and/or the density or the aromatic density of the liquid preparation, and/or the nature of the at least one ingredient, and/or the nature of the fluid, and to trigger an automatic storage, in memory, of the operating parameters of the metering device 500 for this particular liquid preparation, and the correlation between the quantity of the liquid preparation dispensed by the outlet line 5 and the mass of liquid to be dispensed upstream of the pump 3.

The invention further relates to a machine 1000 for making a liquid preparation, which machine includes at least one such metering device 500.

More particularly, this machine 1000 is arranged for the instantaneous production of a liquid food preparation based on at least one powdered or concentrated or freeze-dried ingredient, and at least one fluid, and the at least one doser 4 consists of a percolator filter, or a sachet, or a capsule, or a cartridge or a pod and includes a dose of the at least one ingredient.

More particularly, the machine 1000 is designed to instantly make coffee, and is a community percolator or a household appliance.

The invention claimed is:

1. A metering device for a machine for making a liquid preparation, comprising:
   a body,
   a liquid reservoir for storing a fluid and for feeding, via an inlet line, at least one pump arranged to force the fluid, in a liquid and/or vapour state, to pass through at least one doser designed to contain at least one ingredient, for making the preparation, and to dispense the preparation to at least one outlet line, wherein
   the metering device includes continuous measurement means for continuously measuring a total mass of the liquid reservoir and its contents, and control means interfaced with the continuous measurement means and arranged to monitor the total mass as a function of time, and to calculate instantaneously a mass of the preparation already dispensed, to adapt a duration of operation of the pump to ensure that an exact quantity of preparation required is dispensed, and/or to trigger shutdown of the pump when it is detected that the pump is running dry, and
   the continuous measurement means for continuously measuring the total mass of the liquid reservoir and its contents includes means for weighing the liquid reservoir and its contents, and
   the means for weighing is equipped with a sensor arranged between the body of the machine and the liquid reservoir.

2. The metering device according to claim 1, wherein the means for weighing the liquid reservoir and its contents is arranged to determine an initial mass of the liquid reservoir and its contents, as soon as a production cycle for the preparation is started, and to calculate a mass of liquid to be dispensed upstream of the pump, depending on a nature of the liquid preparation, a density or aromatic density of the liquid preparation, the at least one ingredient of the fluid, and a quantity required at the start of the production cycle, and to activate the pump at the start of the production cycle, to continuously control the weighing of the instantaneous mass of the liquid reservoir and of its contents, and to dispense the required quantity of the liquid preparation.

3. The metering device according to claim 2, wherein the control means is arranged to be activated on starting the production cycle, either by a user action on a control panel interfaced with the control means, or by a command issued by an automated system interfaced with the control means.

4. The metering device according to claim 2, wherein the control means is arranged to detect unexpected filling of the liquid reservoir during operation of said pump.

5. The metering device according to claim 4, wherein the control means is arranged to stop the pump if an increase in the instantaneous mass of the liquid reservoir and its contents, or solely of the contents of the liquid reservoir, is detected.

6. The metering device according to claim 5, wherein the control means is arranged so as, in an event of an increase in the instantaneous mass of the liquid reservoir and of its contents, or solely of the contents of the liquid reservoir, to wait for the mass to stabilise, and restart a supply cycle of the pump until the required quantity of the preparation has been completely dispensed to the at least one outlet line, and stop the operation of the pump when a comparison indicates that the mass of liquid to be dispensed has been dispensed in its entirety to the pump.

7. The metering device according to claim 5, wherein the control means is arranged to measure a value of the initial mass of the liquid reservoir and of its contents, or solely of the contents of the liquid reservoir, at a time of starting the production cycle, and, in an event of the instantaneous mass of the liquid reservoir and of its contents, or solely of the contents of the liquid reservoir, being found to be constant or decreasing, to continuously compare the value of an initial mass of liquid to be dispensed with a value of a difference between the initial mass and the instantaneous mass and stop operation of the pump when a comparison indicates that the mass of liquid to be dispensed has been dispensed in its entirety to the pump.

8. The metering device according to claim 4, wherein the control means is arranged so as, in an event of an increase in the instantaneous mass of the liquid reservoir and its contents, or solely of the contents of the liquid reservoir, to record in memory means included in the control means, a first intermediate mass which is a value of the instantaneous mass of the liquid reservoir and its contents, or solely of the contents of the liquid reservoir, at a moment when the instantaneous mass increases, in order to follow the means for weighing until it is established that the instantaneous mass has stabilised at a second intermediate mass, to calculate a deviation between the second intermediate mass and the first intermediate mass, and to calculate a new upstream mass which is a total of the initial mass and the deviation, and to restart the operation of said pump and continuously carry out a comparison between a value of the mass of liquid to be dispensed and a value of a difference between the upstream mass and the instantaneous mass, and to stop the operation of said pump when the comparison indicates that the mass of liquid to be dispensed has been dispensed in its entirety to the pump.

9. The metering device according to claim 2, wherein the metering device includes shut-off means arranged to prevent the liquid reservoir from being filled when the production cycle is started and until the mass of liquid to be dispensed has been dispensed in its entirety to said pump.

10. The metering device according to claim 2, wherein the control means includes means for storing, in memory, for each type of liquid preparation based on a fluid-ingredient pair, a correlation between a quantity of said fluid to be supplied and a quantity of liquid preparation dispensed.

11. The metering device according to claim 2, wherein the metering device includes, downstream of the at least one outlet line, at least one receptacle designed to receive at least one container configured to receive the liquid preparation, and includes secondary weighing means interfaced with the control means, and designed to measure a tare constituted by the at least one container, and to continuously monitor a quantity of liquid preparation dispensed.

12. The metering device according to claim 2, wherein the metering device includes, at the inlet line, at least one inlet flowmeter interfaced with the control means and a clock included in the control means, for continuously monitoring the quantity of fluid dispensed to the pump.

13. The metering device according to claim 2, wherein the metering device includes, at the at least one outlet line, at least one outlet flowmeter interfaced with the control means and a clock included in the control means, for continuously monitoring the quantity of the liquid preparation dispensed via the at least one outlet line.

14. The metering device according to claim 1, wherein the metering device includes, between the pump and the at least one doser, at least one boiler for heating and/or vaporising the fluid before it passes into the at least one doser.

15. The metering device according to claim 2, wherein the control means includes a control panel or is interfaced with a control panel, and includes a learning cycle arranged to allow a user to prepare a particular liquid preparation manually, and to select a quantity of the particular liquid preparation, and/or a nature of the particular liquid preparation, and/or a density or aromatic density of the particular liquid preparation, and/or a nature of the at least one ingredient, and/or a nature of the fluid, and to trigger automatic storage of operating parameters of the metering device for the particular liquid preparation, and a correlation between the quantity of the liquid preparation at the at least one outlet line and the mass of liquid to be dispensed upstream of said pump.

16. The metering device according to claim 2, wherein the control means includes a control panel or is interfaced with a control panel, and includes a learning cycle arranged to allow an automated system interfaced with the control means to control dispensing of a particular liquid preparation, and to select a quantity of the particular liquid preparation, and/or a nature of the particular liquid preparation, and/or a density or aromatic density of the particular liquid preparation, and/or a nature of the at least one ingredient, and/or a nature of the fluid, and to trigger automatic storage of operating parameters of the metering device for the particular liquid preparation, and a correlation between the quantity of the liquid preparation dispensed by the at least one outlet line and the mass of liquid to be dispensed upstream of the pump.

17. A machine for making a liquid preparation, including at least one metering device according to claim 1.

18. The machine according to claim 17, wherein
the machine is designed for instantaneous production of a liquid food preparation based on at least one powdered or concentrated or freeze-dried ingredient, and on at least one fluid, and
the at least one doser consists of a percolator filter, or a cartridge, or a sachet, or a capsule, or a pod, and includes a dose of the at least one ingredient.

19. The machine according to claim 17, wherein the control means includes a monitoring function for monitoring in real time a ratio between, an initial duration, measured during learning or first use, and corresponding to a supply of a mass of liquid to be dispensed in order to provide an ideal volume, and an actual time required to supply the same mass after multiple months/years of introduction functions, for a particular preparation, and for comparing the ratio in real time with a pre-determined threshold value for the ratio, a threshold which once exceeded gives rise to display of a maintenance message to trigger a maintenance operation.

20. The machine according to claim 17, wherein the machine is designed for instant production of coffee, and is a community percolator or a household appliance.

21. A method for instant production of a liquid preparation based on at least one powdered or concentrated or freeze-dried ingredient, and at least one fluid, in a machine for making a liquid preparation, including a liquid reservoir for storing one of the at least one fluid and for feeding, via an inlet line, at least one pump designed to force the at least one fluid, in a liquid and/or vapour state, to pass through at least one doser designed to contain the at least one ingredient, for making the preparation, and to dispense the preparation to at least one outlet line, wherein the machine is equipped with a metering device which includes means for continuously measuring a mass either of the liquid reservoir and its contents or solely of the contents of the liquid reservoir, comprising:

estimating a total quantity of liquid preparation to be dispensed at an outlet of said machine at each outlet line, estimating a total quantity of fluid to be supplied upstream at the inlet line in order to obtain the total quantity of liquid preparation to be dispensed at the outlet, supplying the liquid reservoir with at least the total quantity of fluid to be supplied, supplying at least one doser with the at least one ingredient, and operating the machine continuously or in stages until the metering device determines that the total quantity of fluid to be supplied has been dispensed in its entirety to the inlet line.

22. The method according to claim 21, wherein the machine is equipped with control means including at least memory means capable of storing, in memory, for a given liquid preparation, at least one parameter including at least a ratio between the total quantity of fluid to be supplied and the total quantity of liquid preparation to be dispensed, for a given liquid preparation, manual calibration is performed by actuating the pump until a required quantity and quality of liquid preparation are obtained, and each at least one parameter relating to the given liquid preparation is stored in the memory means.

23. The method according to claim 21, wherein said metering device is equipped with secondary weighing means at an outlet of the machine for continuously monitoring the quantity of liquid preparation dispensed, said machine is equipped with control means including at least memory means capable of storing, for a given liquid preparation, at least one parameter including at least a ratio between the total quantity of fluid to be supplied and the total quantity of liquid preparation to be dispensed, for a given liquid preparation, automatic calibration is performed by controlling the operation of said pump using the control means until a required quantity of liquid preparation measured by said secondary weighing means is obtained, and each at least one parameter relating to the given liquid preparation is stored in the memory means.

24. The method according to claim 22, wherein, in order to obtain the given liquid preparation, the control means is informed of a nature of the given liquid preparation and a production cycle entirely managed by the control means is started.

* * * * *